(12) United States Patent
Yerramalli et al.

(10) Patent No.: US 10,104,565 B2
(45) Date of Patent: Oct. 16, 2018

(54) CSI FEEDBACK IN LTE/LTE-ADVANCED SYSTEMS WITH UNLICENSED SPECTRUM

(71) Applicant: QUALCOMM Incorporated, San Diego, CA (US)

(72) Inventors: Srinivas Yerramalli, San Diego, CA (US); Wanshi Chen, San Diego, CA (US); Tao Luo, San Diego, CA (US); Peter Gaal, San Diego, CA (US); Durga Prasad Malladi, San Diego, CA (US); Yongbin Wei, San Diego, CA (US); Hao Xu, San Diego, CA (US); Tingfang Ji, San Diego, CA (US); Naga Bhushan, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 257 days.

(21) Appl. No.: 14/565,063

(22) Filed: Dec. 9, 2014

(65) Prior Publication Data

US 2015/0173056 A1 Jun. 18, 2015

Related U.S. Application Data

(60) Provisional application No. 61/916,001, filed on Dec. 13, 2013.

(51) Int. Cl.
*H04W 72/04* (2009.01)
*H04L 5/00* (2006.01)
(Continued)

(52) U.S. Cl.
CPC .......... *H04W 24/10* (2013.01); *H04L 5/0048* (2013.01); *H04W 16/14* (2013.01);
(Continued)

(58) Field of Classification Search
CPC . H04W 74/002; H04W 74/006; H04W 74/08; H04W 74/0808; H04W 74/0816;
(Continued)

(56) References Cited

U.S. PATENT DOCUMENTS 8,934,583 B1 * 1/2015 Qi .......................... H04B 1/109
370/509
9,060,362 B2 * 6/2015 Harel ................ H04W 72/0413
(Continued)

FOREIGN PATENT DOCUMENTS

WO WO 2012109195 A2 8/2012
WO WO-2014189913 11/2014

OTHER PUBLICATIONS

International Search Report and Written Opinion—PCT/US2014/069746—ISA/EPO—dated Mar. 23, 2015.
(Continued)

*Primary Examiner* — Jeffrey M Rutkowski
*Assistant Examiner* — Jonathan B Wood
(74) *Attorney, Agent, or Firm* — Liem T. Do

(57) ABSTRACT

Channel state information (CSI) feedback in long term evolution (LTE) and LTE-Advanced (LTE-A) networks including unlicensed spectrum is disclosed in which a base station obtains clear channel assessment (CCA) result information from neighboring base stations, either directly or by determining such results from measurement or reports from user equipment (UE) served by the base station. The base station may then generate control signaling based on the CCA result information for transmission to the one or more UEs served by the base station.

28 Claims, 9 Drawing Sheets

(51) Int. Cl.
    *H04W 24/10* (2009.01)
    *H04W 16/14* (2009.01)
    *H04W 74/08* (2009.01)
    *H04W 84/12* (2009.01)

(52) U.S. Cl.
    CPC ... *H04W 72/0406* (2013.01); *H04W 74/0808* (2013.01); *H04W 72/04* (2013.01); *H04W 84/12* (2013.01)

(58) Field of Classification Search
    CPC .......... H04W 74/0825; H04W 74/0833; H04L 12/413
    See application file for complete search history.

(56) References Cited

U.S. PATENT DOCUMENTS

| | | | | |
|---|---|---|---|---|
| 2002/0136183 | A1* | 9/2002 | Chen | H04W 72/1215 370/338 |
| 2004/0047324 | A1* | 3/2004 | Diener | H04L 1/1664 370/338 |
| 2005/0152313 | A1* | 7/2005 | Cave | H04W 74/08 370/333 |
| 2006/0009161 | A1* | 1/2006 | Beecher | H04W 28/18 455/67.11 |
| 2006/0176846 | A1* | 8/2006 | Miki | H04J 3/0664 370/328 |
| 2007/0014269 | A1* | 1/2007 | Sherman | H04J 3/0661 370/338 |
| 2007/0072638 | A1* | 3/2007 | Yang | H04W 52/50 455/522 |
| 2007/0242621 | A1* | 10/2007 | Nandagopalan | H04L 12/413 370/254 |
| 2007/0286122 | A1* | 12/2007 | Fonseca | H04L 1/0021 370/329 |
| 2008/0146156 | A1* | 6/2008 | Makhlouf | H04W 74/0808 455/63.1 |
| 2008/0268778 | A1* | 10/2008 | De La Garrigue | H01Q 1/007 455/41.2 |
| 2009/0052574 | A1* | 2/2009 | Li | H04L 1/0001 375/296 |
| 2009/0103435 | A1* | 4/2009 | Celentano | H04W 28/22 370/232 |
| 2009/0252095 | A1* | 10/2009 | Lu | H04W 16/14 370/329 |
| 2009/0323608 | A1 | 12/2009 | Adachi et al. | |
| 2010/0034159 | A1* | 2/2010 | Shin | H04W 72/1257 370/329 |
| 2010/0034191 | A1* | 2/2010 | Schulz | G01D 21/00 370/350 |
| 2010/0085930 | A1* | 4/2010 | Shin | H04W 72/1278 370/329 |
| 2010/0232365 | A1* | 9/2010 | Lu | H04W 72/085 370/329 |
| 2011/0002252 | A1* | 1/2011 | Kim | H04W 52/0216 370/311 |
| 2011/0151793 | A1* | 6/2011 | Lee | H04W 72/085 455/63.1 |
| 2011/0170435 | A1 | 7/2011 | Kim et al. | |
| 2011/0211627 | A1 | 9/2011 | Suzuki et al. | |
| 2012/0134280 | A1* | 5/2012 | Rotvold | H04B 17/24 370/252 |
| 2012/0230205 | A1* | 9/2012 | An | H04W 28/044 370/242 |
| 2012/0257585 | A1* | 10/2012 | Sydor | H04W 72/082 370/329 |
| 2013/0017794 | A1* | 1/2013 | Kloper | H04W 74/0808 455/63.1 |
| 2013/0100888 | A1 | 4/2013 | Shimezawa et al. | |
| 2013/0114430 | A1 | 5/2013 | Koivisto et al. | |
| 2013/0157660 | A1 | 6/2013 | Awad et al. | |
| 2013/0182610 | A1* | 7/2013 | Pantelidou | H04W 74/08 370/255 |
| 2013/0194944 | A1* | 8/2013 | Soyak | H04W 16/14 370/252 |
| 2013/0203458 | A1* | 8/2013 | Charbit | H04W 52/34 455/522 |
| 2013/0208587 | A1* | 8/2013 | Bala | H04W 16/14 370/230 |
| 2013/0244720 | A1* | 9/2013 | Hsia | H04B 17/13 455/552.1 |
| 2013/0258989 | A1* | 10/2013 | Ribeiro | H04W 72/082 370/329 |
| 2013/0343336 | A1* | 12/2013 | Bai | H04W 72/082 370/329 |
| 2014/0010089 | A1* | 1/2014 | Cai | H04W 48/16 370/241 |
| 2014/0036787 | A1* | 2/2014 | Ganu | H04W 16/10 370/329 |
| 2014/0038625 | A1* | 2/2014 | Palanivelu | H04W 52/0235 455/450 |
| 2014/0056169 | A1 | 2/2014 | Jung et al. | |
| 2014/0098681 | A1* | 4/2014 | Stager | H04W 24/02 370/252 |
| 2014/0269597 | A1 | 9/2014 | Park et al. | |
| 2014/0321313 | A1 | 10/2014 | Seo et al. | |
| 2014/0341089 | A1 | 11/2014 | Ji et al. | |
| 2014/0369212 | A1* | 12/2014 | Raravi | H04W 40/246 370/252 |
| 2015/0103767 | A1* | 4/2015 | Kim | H04W 74/06 370/329 |
| 2015/0163805 | A1 | 6/2015 | Cattoni et al. | |
| 2015/0172950 | A1 | 6/2015 | Chen et al. | |
| 2015/0237623 | A1* | 8/2015 | Choi | H04W 72/0446 370/329 |
| 2015/0305075 | A1* | 10/2015 | Fodor | H04W 8/005 370/329 |
| 2015/0319700 | A1* | 11/2015 | Oteri | H04W 52/10 455/127.1 |
| 2015/0365960 | A1 | 12/2015 | Davydov et al. | |
| 2016/0013921 | A1 | 1/2016 | Nagata et al. | |
| 2016/0043949 | A1* | 2/2016 | Lee | H04W 84/12 370/328 |
| 2016/0174206 | A1* | 6/2016 | Xia | H04B 7/0491 370/329 |
| 2016/0227489 | A1* | 8/2016 | Oteri | H04W 74/0808 |
| 2016/0381565 | A1* | 12/2016 | Oteri | H04W 16/14 370/328 |
| 2017/0006505 | A1* | 1/2017 | Liu | H04W 28/26 |

OTHER PUBLICATIONS

Ramachandran I., et al., "Clear channel assessment in energyconstrained wideband wireless networks", IEEE Wireless Communications, IEEE Service Center, Piscataway, NJ, US, vol. 14, No. 3, Jun. 1, 2007 (Jun. 1, 2007), pp. 70-78, XP011379389, ISSN: 1536-1284, DOI: 10.1109/MWC.2007.386615.

* cited by examiner

CSI FEEDBACK IN LTE/LTE-ADVANCED SYSTEMS WITH UNLICENSED SPECTRUM

CROSS-REFERENCE TO RELATED APPLICATIONS

This application claims the benefit of U.S. Provisional Patent Application No. 61/916,001, entitled, "CSI FEEDBACK IN LTE/LTE-ADVANCED SYSTEMS WITH UNLICENSED SPECTRUM," filed on Dec. 13, 2013, which is expressly incorporated by reference herein in its entirety.

BACKGROUND

Field

Aspects of the present disclosure relate generally to wireless communication systems, and more particularly, to channel state information (CSI) feedback processes for long term evolution (LTE) and LTE-Advanced (LTE-A) communication system including unlicensed spectrum.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes obtaining, by a base station, clear channel assessment (CCA) result information for a plurality of neighboring base stations, generating, by the base station, control signaling for one or more UEs served by the base station, wherein the control signaling is based, at least in part, on the CCA result information, and transmitting the control signaling to the one or more UEs.

In an additional aspect of the disclosure, a method of wireless communication including detecting, by a UE, transmission signals indicative of CCA result information for a plurality of neighboring base stations, determining, by the UE, CCA result information estimate for the plurality of neighboring base stations based on the transmission signals indicative of CCA result information, and transmitting, by the UE, a measurement report to a serving base station, wherein the measurement report includes the CCA result information estimate.

In an additional aspect of the disclosure, an apparatus configured for wireless communication includes means for obtaining, by a base station, CCA result information for a plurality of neighboring base stations, means for generating, by the base station, control signaling for one or more UEs served by the base station, wherein the control signaling is based, at least in part, on the CCA result information, and means for transmitting the control signaling to the one or more UEs.

In an additional aspect of the disclosure, an apparatus configured for wireless communication including means for detecting, by a UE, transmission signals indicative of CCA result information for a plurality of neighboring base stations, means for determining, by the UE, CCA result information estimate for the plurality of neighboring base stations based on the transmission signals indicative of CCA result information, and means for transmitting, by the UE, a measurement report to a serving base station, wherein the measurement report includes the CCA result information estimate.

In an additional aspect of the disclosure, a computer program product has a computer-readable medium having program code recorded thereon. This program code includes code to obtain, by a base station, CCA result information for a plurality of neighboring base stations, code to generate, by the base station, control signaling for one or more UEs served by the base station, wherein the control signaling is based, at least in part, on the CCA result information, and code to transmit the control signaling to the one or more UEs.

In an additional aspect of the disclosure, a computer program product has a computer-readable medium having program code recorded thereon. This program code includes code to detect, by a UE, transmission signals indicative of CCA result information for a plurality of neighboring base stations, code to determine, by the UE, CCA result information estimate for the plurality of neighboring base stations based on the transmission signals indicative of CCA result information, and code to transmit, by the UE, a measurement report to a serving base station, wherein the measurement report includes the CCA result information estimate.

In an additional aspect of the disclosure, an apparatus includes at least one processor and a memory coupled to the processor. The processor is configured to obtain, by a base station, CCA result information for a plurality of neighboring base stations, to generate, by the base station, control signaling for one or more UEs served by the base station, wherein the control signaling is based, at least in part, on the CCA result information, and to transmit the control signaling to the one or more UEs.

In an additional aspect of the disclosure, an apparatus includes at least one processor and a memory coupled to the processor. The processor is configured to detect, by a UE, transmission signals indicative of CCA result information for a plurality of neighboring base stations, to determine, by the UE, CCA result information estimate for the plurality of neighboring base stations based on the transmission signals indicative of CCA result information, and to transmit, by the UE, a measurement report to a serving base station, wherein the measurement report includes the CCA result information estimate.

DETAILED DESCRIPTION

Figure 1:
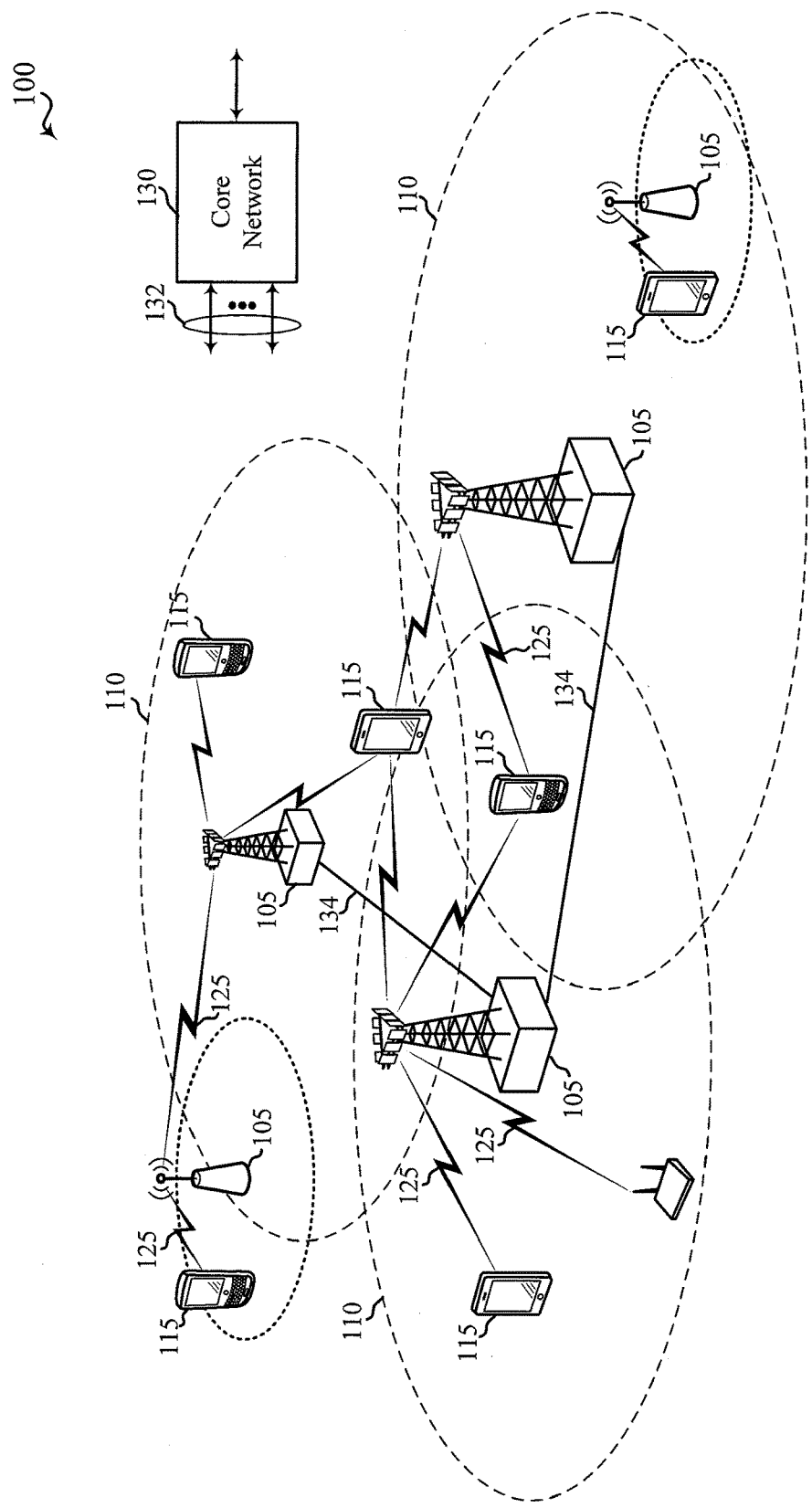
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Operators have so far looked at WiFi as the primary mechanism to use unlicensed spectrum to relieve ever increasing levels of congestion in cellular networks. However, a new carrier type (NCT) based on LTE/LTE-A including an unlicensed spectrum may be compatible with carrier-grade WiFi, making LTE/LTE-A with unlicensed spectrum an alternative to WiFi. LTE/LTE-A with unlicensed spectrum may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE/LTE-A with unlicensed spectrum may perform significantly better than WiFi. For example, an all LTE/LTE-A with unlicensed spectrum deployment (for single or multiple operators) compared to an all WiFi deployment, or when there are dense small cell deployments, LTE/LTE-A with unlicensed spectrum may perform significantly better than WiFi. LTE/LTE-A with unlicensed spectrum may perform better than WiFi in other scenarios such as when LTE/LTE-A with unlicensed spectrum is mixed with WiFi (for single or multiple operators).

For a single service provider (SP), an LTE/LTE-A network with unlicensed spectrum may be configured to be synchronous with a LTE network on the licensed spectrum. However, LTE/LTE-A networks with unlicensed spectrum deployed on a given channel by multiple SPs may be configured to be synchronous across the multiple SPs. One approach to incorporate both the above features may involve using a constant timing offset between LTE/LTE-A networks without unlicensed spectrum and LTE/LTE-A networks with unlicensed spectrum for a given SP. An LTE/LTE-A network with unlicensed spectrum may provide unicast and/or multicast services according to the needs of the SP. Moreover, an LTE/LTE-A network with unlicensed spectrum may operate in a bootstrapped mode in which LTE cells act as anchor and provide relevant cell information (e.g., radio frame timing, common channel configuration, system frame number or SFN, etc.) for LTE/LTE-A cells with unlicensed spectrum. In this mode, there may be close interworking between LTE/LTE-A without unlicensed spectrum and LTE/LTE-A with unlicensed spectrum. For example, the bootstrapped mode may support the supplemental downlink and the carrier aggregation modes described above. The PHY-MAC layers of the LTE/LTE-A network with unlicensed spectrum may operate in a standalone mode in which the LTE/LTE-A network with unlicensed spectrum operates independently from an LTE network without unlicensed spectrum. In this case, there may be a loose interworking between LTE without unlicensed spectrum and LTE/LTE-A with unlicensed spectrum based on RLC-level aggregation with co-located LTE/LTE-A with/without unlicensed spectrum cells, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In some embodiments, the system 100 is an LTE/LTE-A network that supports one or more unlicensed spectrum modes of operation or deployment scenarios. In other embodiments, the system 100 may support wireless communications using an unlicensed spectrum and an access technology different from LTE/LTE-A with unlicensed spectrum, or a licensed spectrum and an access technology different from LTE/LTE-A. The terms evolved Node B (eNB) and user equipment (UE) may be generally used to describe the base stations 105 and devices 115, respectively. The system 100 may be a Heterogeneous LTE/LTE-A network with or without unlicensed spectrum in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using a licensed spectrum (e.g., LTE), an unlicensed spectrum (e.g., LTE/LTE-A with unlicensed spectrum), or both (LTE/LTE-A with/without unlicensed spectrum). Similarly, the uplink transmissions may be made using a licensed spectrum (e.g., LTE), an unlicensed spectrum (e.g., LTE/LTE-A with unlicensed spectrum), or both (LTE/LTE-A with/without unlicensed spectrum).

In some embodiments of the system 100, various deployment scenarios for LTE/LTE-A with unlicensed spectrum may be supported including a supplemental downlink (SDL) mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed spectrum, while SC-FDMA communications signals may be used in the communications links 125 for LTE uplink transmissions in an unlicensed spectrum. Additional details regarding the implementation of LTE/LTE-A with unlicensed spectrum deployment scenarios or modes of operation in a system such as the system 100, as well as other features and functions related to the operation of LTE/LTE-A with unlicensed spectrum, are provided below with reference to FIGS. 2A-6C.

Figure 2A:
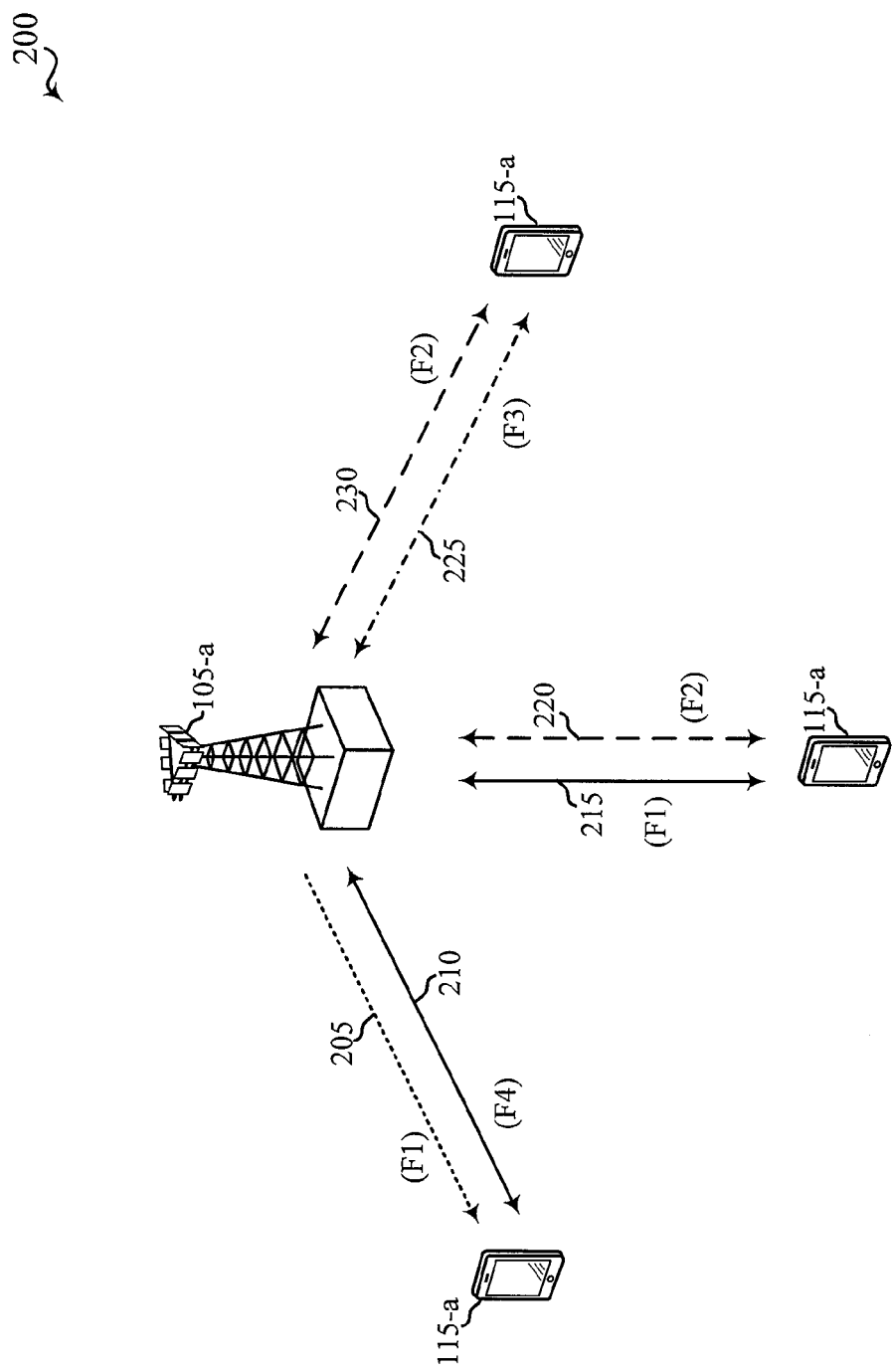
FIG. 2A shows a diagram that illustrates examples of deployment scenarios for using LTE in an unlicensed spectrum according to various embodiments.

Turning next to FIG. 2A, a diagram 200 shows examples of a supplemental downlink mode and of a carrier aggregation mode for an LTE network that supports LTE/LTE-A with unlicensed spectrum. The diagram 200 may be an example of portions of the system 100 of FIG. 1. Moreover, the base station 105-a may be an example of the base stations 105 of FIG. 1, while the UEs 115-a may be examples of the UEs 115 of FIG. 1.

In the example of a supplemental downlink mode in diagram 200, the base station 105-a may transmit OFDMA communications signals to a UE 115-a using a downlink 205. The downlink 205 is associated with a frequency F1 in an unlicensed spectrum. The base station 105-a may transmit OFDMA communications signals to the same UE 115-a using a bidirectional link 210 and may receive SC-FDMA communications signals from that UE 115-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-a. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-a may transmit OFDMA communications signals to a UE 115-a using a bidirectional link 215 and may receive SC-FDMA communications signals from the same UE 115-a using the bidirectional link 215. The bidirectional link 215 is associated with the frequency F1 in the unlicensed spectrum. The base station 105-a may also transmit OFDMA communications signals to the same UE 115-a using a bidirectional link 220 and may receive SC-FDMA communications signals from the same UE 115-a using the bidirectional link 220. The bidirectional link 220 is associated with a frequency F2 in a licensed spectrum. The bidirectional link 215 may provide a downlink and uplink capacity offload for the base station 105-a. Like the supplemental downlink described above, this scenario may occur with any service provider (e.g., MNO) that uses a licensed spectrum and needs to relieve some of the traffic and/or signaling congestion.

In another example of a carrier aggregation mode in diagram 200, the base station 105-a may transmit OFDMA communications signals to a UE 115-a using a bidirectional link 225 and may receive SC-FDMA communications signals from the same UE 115-a using the bidirectional link 225. The bidirectional link 225 is associated with the frequency F3 in an unlicensed spectrum. The base station 105-a may also transmit OFDMA communications signals to the same UE 115-a using a bidirectional link 230 and may receive SC-FDMA communications signals from the same UE 115-a using the bidirectional link 230. The bidirectional link 230 is associated with the frequency F2 in the licensed spectrum. The bidirectional link 225 may provide a downlink and uplink capacity offload for the base station 105-a. This example and those provided above are presented for illustrative purposes and there may be other similar modes of operation or deployment scenarios that combine LTE/LTE-A with or without unlicensed spectrum for capacity offload.

As described above, the typical service provider that may benefit from the capacity offload offered by using LTE/LTE-A with unlicensed spectrum is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the LTE secondary component carrier (SCC) on the unlicensed spectrum.

In the supplemental downlink mode, control for LTE/LTE-A with unlicensed spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A with unlicensed spectrum (e.g., bidirectional links 215 and 225). The carrier aggregation mechanisms supported when using LTE/LTE-A with unlicensed spectrum may fall under a hybrid frequency division duplexing-time division duplexing (FDD-TDD) carrier aggregation or a TDD-TDD carrier aggregation with different symmetry across component carriers.

Figure 2B:
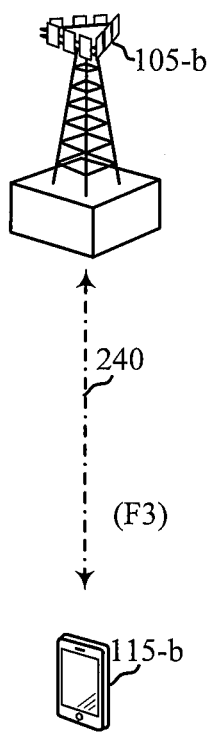
FIG. 2B shows a diagram that illustrates another example of a deployment scenario for using LTE in an unlicensed spectrum according to various embodiments.

FIG. 2B shows a diagram 200-a that illustrates an example of a standalone mode for LTE/LTE-A with unlicensed spectrum. The diagram 200-a may be an example of portions of the system 100 of FIG. 1. Moreover, the base station 105-b may be an example of the base stations 105 of FIG. 1 and the base station 105-a of FIG. 2A, while the UE 115-b may be an example of the UEs 115 of FIG. 1 and the UEs 115-a of FIG. 2A.

In the example of a standalone mode in diagram 200-a, the base station 105-b may transmit OFDMA communications signals to the UE 115-b using a bidirectional link 240 and may receive SC-FDMA communications signals from the UE 115-*b* using the bidirectional link 240. The bidirectional link 240 is associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the PCC on the unlicensed spectrum. Moreover, LBT may be implemented on both the base station and the UE.

Figure 3:
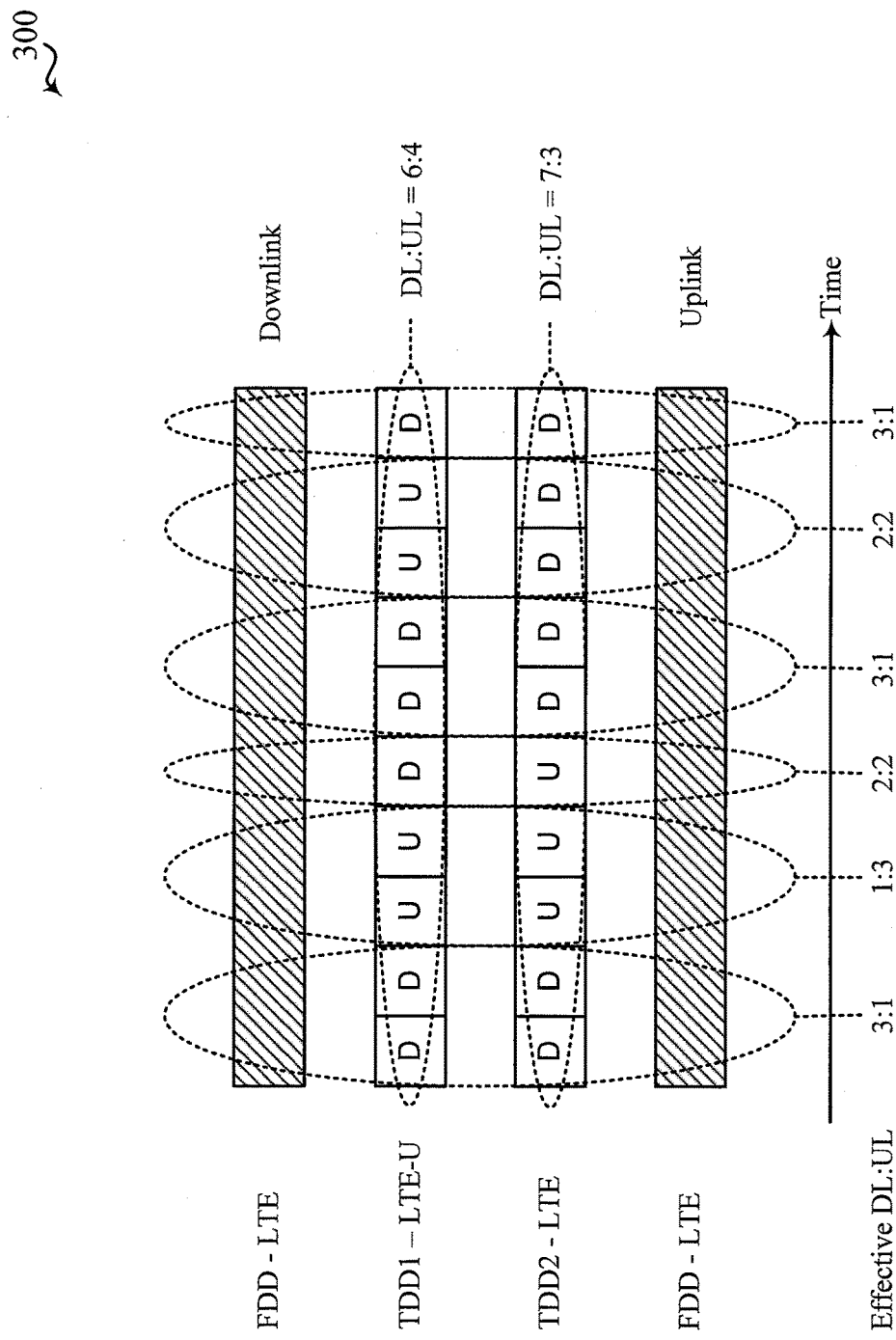
FIG. 3 shows a diagram that illustrates an example of carrier aggregation when using LTE concurrently in licensed and unlicensed spectrum according to various embodiments.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described above with reference to FIG. 2A. This type of carrier aggregation may be used in at least portions of the system 100 of FIG. 1. Moreover, this type of carrier aggregation may be used in the base stations 105 and 105-*a* of FIG. 1 and FIG. 2A, respectively, and/or in the UEs 115 and 115-*a* of FIG. 1 and FIG. 2A, respectively.

In this example, an FDD (FDD-LTE) may be performed in connection with LTE in the downlink, a first TDD (TDD1) may be performed in connection with LTE/LTE-A with unlicensed spectrum, a second TDD (TDD2) may be performed in connection with LTE with licensed spectrum, and another FDD (FDD-LTE) may be performed in connection with LTE in the uplink with licensed spectrum. TDD1 results in a DL:UL ratio of 6:4, while the ratio for TDD2 is 7:3. On the time scale, the different effective. DL:UL ratios are 3:1, 1:3, 2:2, 3:1, 2:2, and 3:1. This example is presented for illustrative purposes and there may be other carrier aggregation schemes that combine the operations of LTE/LTE-A with or without unlicensed spectrum.

Figure 4:
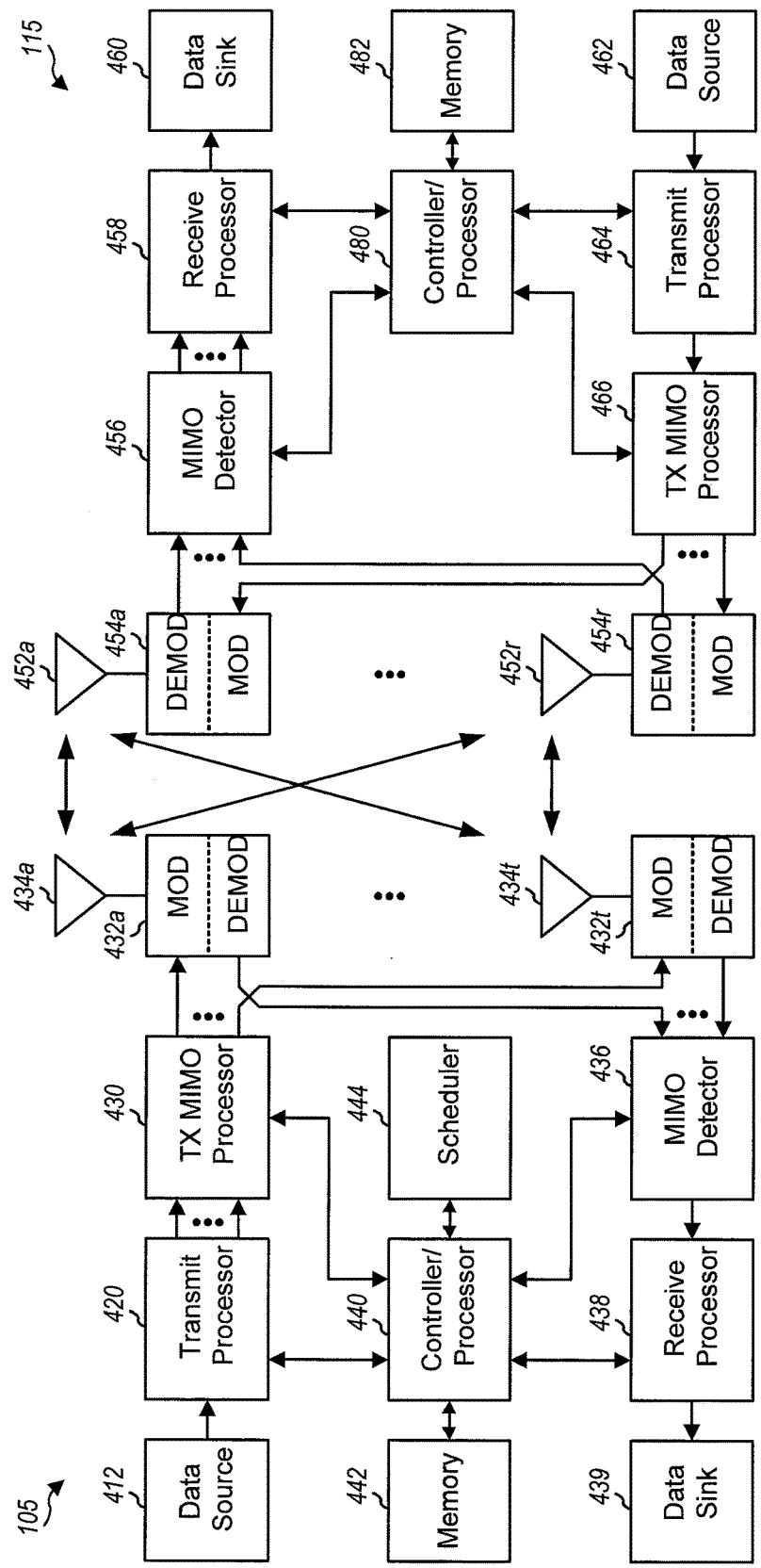
FIG. 4 is a block diagram illustrating a design of a base station/eNB and a UE configured according to one aspect of the present disclosure.

FIG. 4 shows a block diagram of a design of a base station/eNB 105 and a UE 115, which may be one of the base stations/eNBs and one of the UEs in FIG. 1. The eNB 105 may be equipped with antennas 434*a* through 434*t*, and the UE 115 may be equipped with antennas 452*a* through 452*r*. At the eNB 105, a transmit processor 420 may receive data from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 115, the antennas 452*a* through 452*r* may receive the downlink signals from the eNB 105 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 115 to a data sink 460, and provide decoded control information to a controller/processor 480.

On the uplink, at the UE 115, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454*a* through 454*r* (e.g., for SC-FDM, etc.), and transmitted to the eNB 105. At the eNB 105, the uplink signals from the UE 115 may be received by the antennas 434, processed by the modulators 432, detected by a MIMO detector 436 if applicable, and further processed by a receive processor 438 to obtain decoded data and control information sent by the UE 115. The processor 438 may provide the decoded data to a data sink 439 and the decoded control information to the controller/processor 440.

The controllers/processors 440 and 480 may direct the operation at the eNB 105 and the UE 115, respectively. The controller/processor 440 and/or other processors and modules at the eNB 105 may perform or direct the execution of various processes for the techniques described herein. The controllers/processor 480 and/or other processors and modules at the UE 115 may also perform or direct the execution of the functional blocks illustrated in FIGS. 5A and 5B, and/or other processes for the techniques described herein. The memories 442 and 482 may store data and program codes for the eNB 105 and the UE 115, respectively. A scheduler 444 may schedule UEs for data transmission on the downlink and/or uplink.

In extending LTE/LTE-A to unlicensed spectrum, various additional constraints, such as the LBT requirements result in non-guaranteed transmissions over the unlicensed spectrum. With such constraints, considerations for CSI feedback, in general, and in fast feedback operations may be made in LTE/LTE-A systems with unlicensed spectrum. In such systems, a question may arise as to whether channel information or interference information is more desirable for fast feedback.

In current LTE/LTE-A systems, CSI feedback may be based on a reference subframe for noise estimation in which the reference subframe is identified according to the equation n-M, where n represents the current subframe and M represents the number of subframes prior to the current subframe in which the reference subframe is located. For example, in typical LTE/LTE-A systems, M=4 or 5 subframes. Channel estimates for channel condition CSI feedback may also be determined with unconstrained channel measurement in current systems.

In order to compute the CSI feedback at the UE, the CSI feedback block receives two inputs: the channel estimate and the noise estimate. In fast CSI feedback, such as in transmit modes 3 or 4 (TM3/TM4) CSI reports in either periodic or wideband constraints may be generated with an overhead of approximately 20 us when generated in hardware implementations or with an overhead of 30 us when generated using software implementations.

As noted, LTE/LTE-A systems with unlicensed spectrum bring a number of new considerations for both channel and interference conditions. LTE/LTE-A systems with unlicensed spectrum may experience various additional interference sources. For example, Interference may originate from an unlicensed signal from the same or "serving" operator. Assuming synchronized operation within one operator, this interference may originate from either a eNB or UE or both. Unlicensed signals from different operators may also result in interference, and such interfering signals, as originating from different operators, may not be synchronized. Further, interference may be experienced from WiFi signals. Interfering WiFi signals may be asynchronous with respect to LTE/LTE-A systems with unlicensed spectrum. However, such WiFi signals may not impact LTE/LTE-A systems with unlicensed spectrum depending on the interactions between the LTE/LTE-A systems with unlicensed spectrum components and the WiFi devices.

In addition to differences in interference sources, LTE/LTE-A systems with unlicensed spectrum introduce new interference patterns. The LBT procedures may introduce more variables to the interference pattern. Thus, some interference patterns may depend on the joint distribution of CCA status for each LBT frame. Again, the interference may originate from either the same/serving or different operators. This is in addition to the variations in traffic patterns caused by the LBT procedures and non-guaranteed transmissions.

In order to address the additional sources and patterns of interference present in LTE/LTE-A networks with unlicensed spectrum, various aspects of the present disclosure are configured to differentiate between the source of interference when computing channel state information (CSI), whether interference from the same operator, from different operators, and from WiFi transmissions. When generating control signaling to accommodate the varying channel conditions, base stations may use knowledge of CCA results of neighboring base stations as well as a computation of interference that is not only reflective of current interference conditions, but also include interference experienced over a number of transmission or LBT subframes. Such interference information, as it depends on both current and historic interference values and probabilities is referred to herein as hysteretic interference information. The base station generates such control signaling based on such CCA results information, hysteretic interference information, and any combination of such either determined by the base station, received directly from the neighbor base stations via backhaul, or received in measurement reports from served UEs.

Figures 5A, 5B:
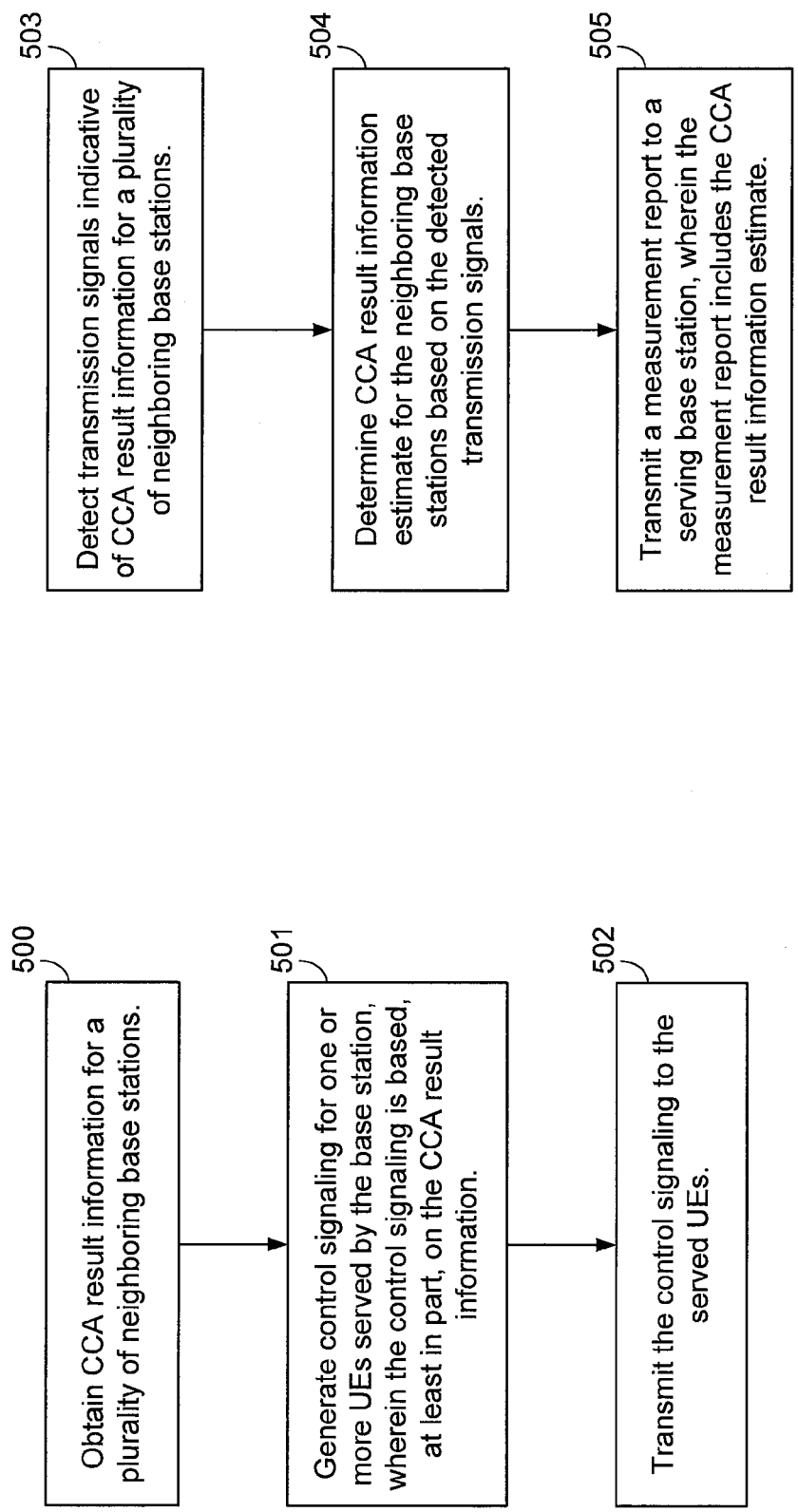
FIGS. 5A and 5B are functional block diagrams illustrating example blocks executed to implement aspects of the present disclosure.

FIG. 5A is a functional block diagram illustrating example blocks executed at a base station to implement one aspect of the present disclosure. At block 500, a base station, such as base station 105 (FIG. 4), obtains CCA result information for a plurality of neighboring base stations. This CCA result information may be obtained directly from the neighboring base stations via backhaul, when such neighboring base stations are operated by the same mobile network operator (MNO). The CCA result information may also be estimated or determined based on listening for and detecting transmission signals indicative of CCA results, such as channel usage beacon signals (CUBS) and channel state information reference signals (CSI-RS) that may be transmitted from the neighboring base stations when CCA clearance has been obtained by those neighboring base stations. The estimated CCA result information may be determined by the base station or by various served UEs, which include this information in measurement reports transmitted to the serving base station.

At block 501, the base station generates control signaling for one or more of its served UEs using the CCA result information. When the base station, such as base station 105 knows the CCA result information, which may include the probabilities of the CCA results of the neighboring base stations over several transmission frames, the base station may intelligently select appropriate control signals for the UEs to accommodate or handle any interference that may be attributable to the neighboring base stations. For example, with knowledge of the CCA results information, the base station may select a suitable modulation coding scheme (MCS) for each of the served UEs. Once the control signaling is generated, then, at block 502, the base station transmits the generated control signaling to the appropriate UEs.

FIG. 5B is a functional block diagram illustrating example blocks executed by a UE to implement one aspect of the present disclosure. At block 503, a UE detects transmission signals indicative of CCA result information for a plurality of neighboring base stations. When a transmitting entity detects a clear CCA, it generally begins to transmit on the cleared channel immediately, using CUBS. Additionally, when base stations have cleared a channel with a successful CCA check, CSI-RS signals are transmitted to served UEs in order to obtain CSI feedback for controlling communications between the base station and particular UE.

At block 504, the UE determines CCA result information estimates for the neighboring base stations based on transmission signals indicative of the CCA result information. A UE, such as UE 115, may detect such signals, e.g., CUBS, CSI-RS, and the like, over the current frame or over multiple transmission frames in order to deduce or estimate CCA result probabilities for the neighboring base stations.

At block 505, the UE transmits a measurement report to its serving base station, wherein the measurement report includes the CCA result information estimates. Once the CCA results information has been estimated by the UE, the UE may include that information in a measurement report to the serving base station. The serving base station may then use that information on the additional interference resulting from the LTE/LTE-A communications with unlicensed spectrum to generate and assign appropriate control signaling for further UE communications.

Because deployment of LTE/LTE-A networks using unlicensed spectrum provides varying interference patterns from multiple potential sources, various scenarios may be experienced between locations of networks in which all neighbors are within the same MNO, or other locations where the neighbors may include base stations operated by other MNOs which may operate asynchronously from other MNO base stations and locations in which WiFi transmissions may arise either at dedicated WiFi locations or when different WiFi-capable devices begin transmitting in an ad hoc manner.

Figure 6A:
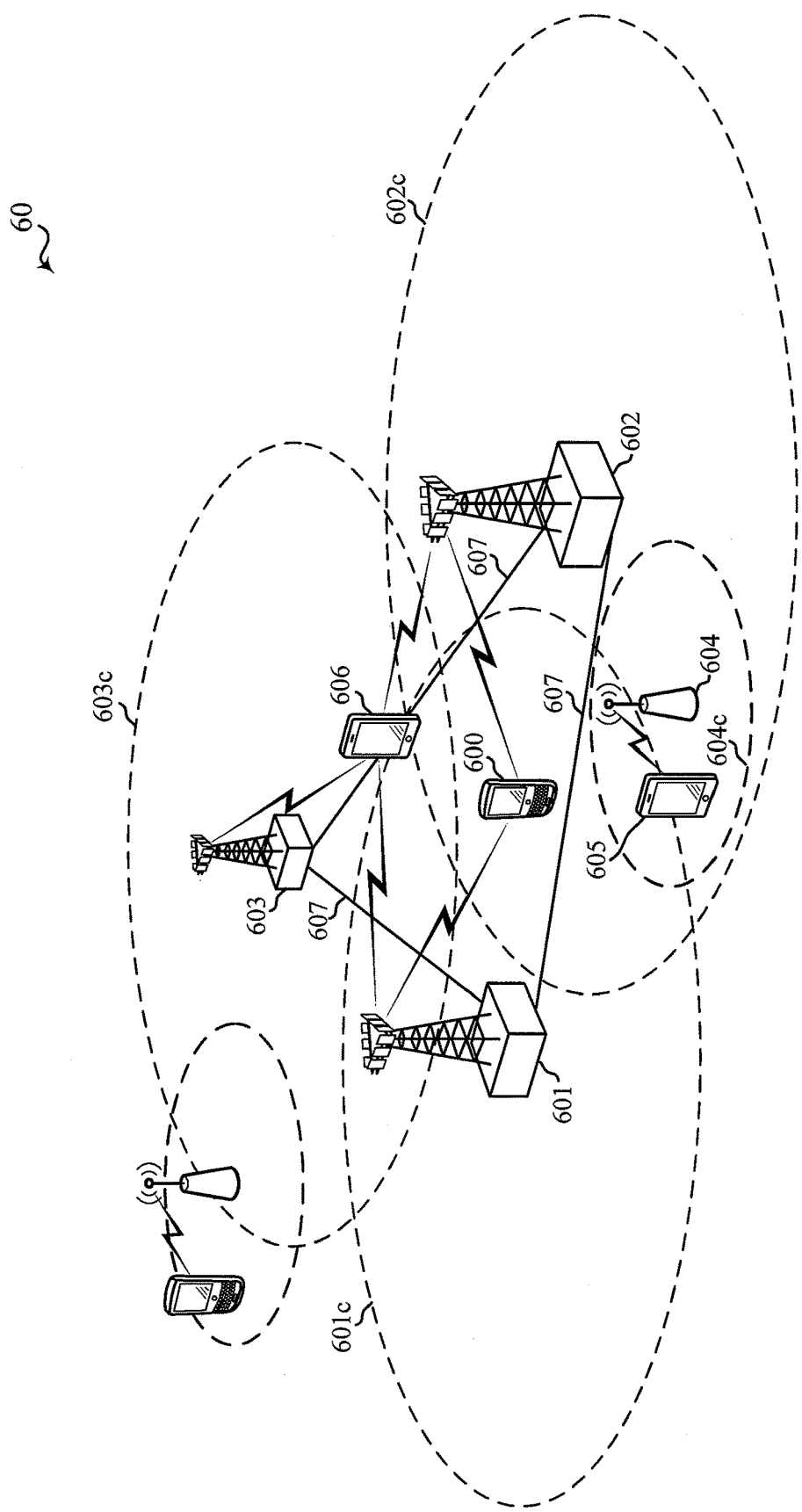
FIGS. 6A-6C are block diagrams illustrating multiple network scenarios illustrating aspects of the present disclosure.

FIG. 6A is a block diagram illustrating network location 60 of an LTE/LTE-A network including unlicensed spectrum. Network location 60 includes eNBs 601-603 each having coverage areas 601c-603c. eNBs 601-603 communicate with each other over backhaul 607. Network location 60 also reflects small eNB 604 with coverage area 604c. eNBs 601-603 and small eNB 604 are each operated by the same MNO and are synchronous with each other. Various user equipment, such as UEs 600, 605 and 606 are located within network location 60 and are served by eNBs 601-603 and small eNB 604, respectively.

In the LTE/LTE-A network with unlicensed spectrum deployed, the interference sources originate with signals from network entities within the same operator ("serving" operator). With the same MNO, synchronized operation may be assumed whether the interfering signals are transmitted from an eNB or UE or both. Because each transmitting entity in network location 60 uses the listen before talk (LBT) procedures, more variability is introduced into the potential interference patterns. For example, the interference pattern may depend on the joint distribution of CCA status for each LBT frame. This is in addition to the traffic pattern variation. For example, when a clear CCA status is obtained, one cleared eNB may not have as much data to transmit as another cleared eNB and, therefore, may transmit for fewer subframes than another cleared eNB.

It should be noted that eNBs that transmit using unlicensed spectrum would likely be smaller cell eNBs, such as femto, pico, or other relay/small cell-type base stations. Macro base stations may not typically use transmissions over unlicensed spectrum, but would more likely transmit using licensed spectrum. However, the various aspects of the present disclosure are not limited to the type of eNB or base station that may utilize unlicensed spectrum in LTE/LTE-A transmissions.

With respect LTE time division duplex (TDD) systems, different eNBs may use different TDD uplink (UL)/downlink (DL) subframe configurations. Thus, one neighbor base station at subframe 3 may be configured for downlink operations while another neighbor or the serving base station, at subframe 3, uses a different UL/DL subframe configuration and, as such, is configured for uplink operations. This transmission mismatch would also lead to interference.

If serving eNB knows CCA decisions from neighboring cells, it may select control signaling for served UEs in order to address the neighboring interference. For example, if eNB 601 knows the CCA decisions from the neighboring cells, eNBs 602-603 and small eNB 604, it may select the appropriate MCS for UE 600. Another example option may be for eNB 601 to select orthogonal demodulation reference signal (DM-RS) ports for pilot signals and select orthogonal precoders for transmission of data. This CCA decision information may be communicated directly from eNBs 602-603 via backhaul 607. Moreover, because eNBs 602 and 603 may provide dominant interference, each may not be active during the same LBT frame. Thus, multiple CSI hypotheses may be used for eNBs 602 and 603 over multiple LBT frames.

Additionally, eNB 601 may synthesize a noise estimate over different LBT frames based on CUBS or CSI-RS detected from eNBs 602-603 and small eNB 604. Based on these detected transmission indicative of CCA response information, a CCA response probability may be determined, which eNB 601 may use to generate appropriate control signals for UE 600.

It should be noted that, when generated over multiple transmission frames or LBT frames, the CCA response information may lose "spatial" resolution. That is, the specific locations and orientations of various interference sources would be averaged or normalized into probabilities instead of specific interference locations.

In additional aspects of the present disclosure, if eNB 601 does not receive CCA decisions directly from its neighboring cells, such as eNBs 602-603 and small eNB 604, eNB 601 may rely on averaged CSI in order to schedule a UE, such UE 600. For example, the CSI computation may take into account the CCA results probability for the dominant interferences for noise estimates. Such a CCA probability may be determined by UE 600 through detection of CUBS, CSI-RS, or other signals in multiple LBT frames, if transmitted. When generated by a UE, such as UE 500, UE 500 would transmit the estimated CCA response probability information to eNB 601 in a measurement report. eNB 601 would then use the estimated CCA response probability information from the received measurement report.

Figure 6B:
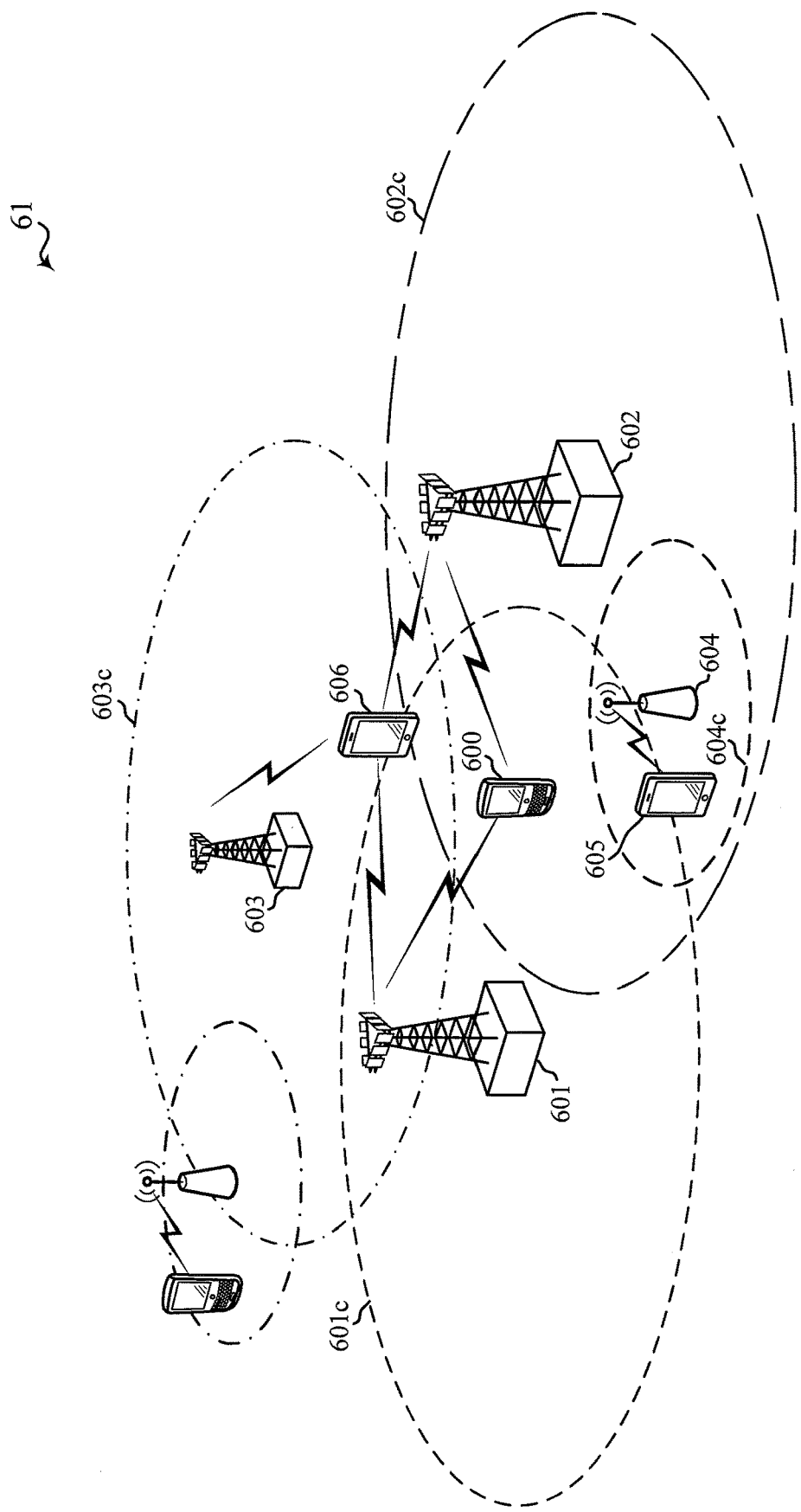

FIG. 6B is a block diagram illustrating network location 61 of an LTE/LTE-A network including unlicensed spectrum. For purposes of the example aspect illustrated in FIG. 6B, the same elements are identified. However, eNB 602 belongs to a different MNO than eNB 601. Similarly, eNB 603 belongs to a different MNO than either of eNBs 601-602. Each of the networks operated by eNBs 601-603 are asynchronous from one another. In such network locations, such as network location 61, interference may originate from many different sources, such as network entities belonging to the MNO of eNB 601, and network entities belonging to the MNOs of eNBs 602 and 603. Interference originating from the different MNOs, such as from eNBs 602 and 603, includes transmissions from UE 605, which is connected to the MNO operated through eNB 602 and small eNB 604, as well as transmissions from eNB 602 and small eNB 604, and transmissions from UE 606, which is connected to the MNO operated through eNB 603, as well as transmissions from eNB 603. The interference from the network entities in the other MNOs is not synchronized with the MNO operated through eNB 601. Thus, additional processing may be performed for detecting various signals through the interfering transmissions.

In addition to the multiple different sources of interference, which may be asynchronous to one another, multiple interference patterns may be encountered. In LTE/LTE-A systems including unlicensed spectrum, the LBT procedures introduce more variables in interference pattern. The interference pattern may depend on the joint distribution of CCA status and results across each of the transmitting entities for each LBT frame, which may be from entities in the same MNO or across different asynchronous MNOs. As noted above with respect to FIG. 6A, this variation of interference pattern based on distribution of CCA results information would be in addition to traffic pattern variations which may arise because of different transmission loads, different TDD UL/DL configurations and the like.

For handling interference from synchronous sources within the same MNO, similar procedures to those described with regard to FIG. 6A may be used. For example, receiving CCA decisions at eNB 601 directly from the other eNBs over a backhaul or by determining the CCA results information based on observed or detected signals indicative of CCA results information. However, network location 61 illustrates three separate MNOs operated through eNBs 601-603, respectively, and no backhaul exists between the different eNBs of the different MNOs. Thus, for interference coming from the different eNBs of the different operators, an average or processed interference may be captured. As noted above, this hysteretic interference information is based not only on current interference measurements or detection, but on interference conditions detected over multiple LBT frames. This hysteretic interference information provides a CCA probability across the various neighboring base stations, such as eNBs 602-603 and small eNB 604.

Interference may be measured when a CCA failure occurs. Because the eNB, such as eNB 601 detects a CCA failure, it will not transmit. Thus, it may listen and measure interference from the neighboring base stations. In additional aspects, weights may be added to the interference to provide some intelligence to the interference measurements. The weights may accommodate for the variability of interference signals that may arise through failed and successful CCAs of the neighboring base stations. The weights may include information from the served UEs, such as UE 600, that identifies how the UE sees interference over multiple transmission subframes. Thus, if the interference probability information from the UE indicates that it experiences a higher percentage of interference from a neighboring eNB in another MNO, e.g., UE 600 seeing interference from eNB 602, the information may be used to modify the interfering signals from eNB 602 that are detected by eNB 601. Because eNB 602 is a further distance from eNB 601 than it is from UE 600, the measured or detected interference may be lower than that seen by UE 600. Therefore, eNB 601 may weight the detected interference using that interference probability information received from UE 600, perhaps in a measurement report or other uplink control signaling, in order to better reflect the actual interference that UE 600 more probably will see from eNB 602.

Using the hysteretic interference information either determined by the serving eNB, such as eNB 601, or as received from a served UE, such as UE 600, when measuring and processing the probability of interference seen over multiple transmission frames, the serving base station may determine the timing of the neighboring MNO and begin to understand the interaction between itself and the asynchronous MNO operated through eNB 603, for example.

Figure 6C:
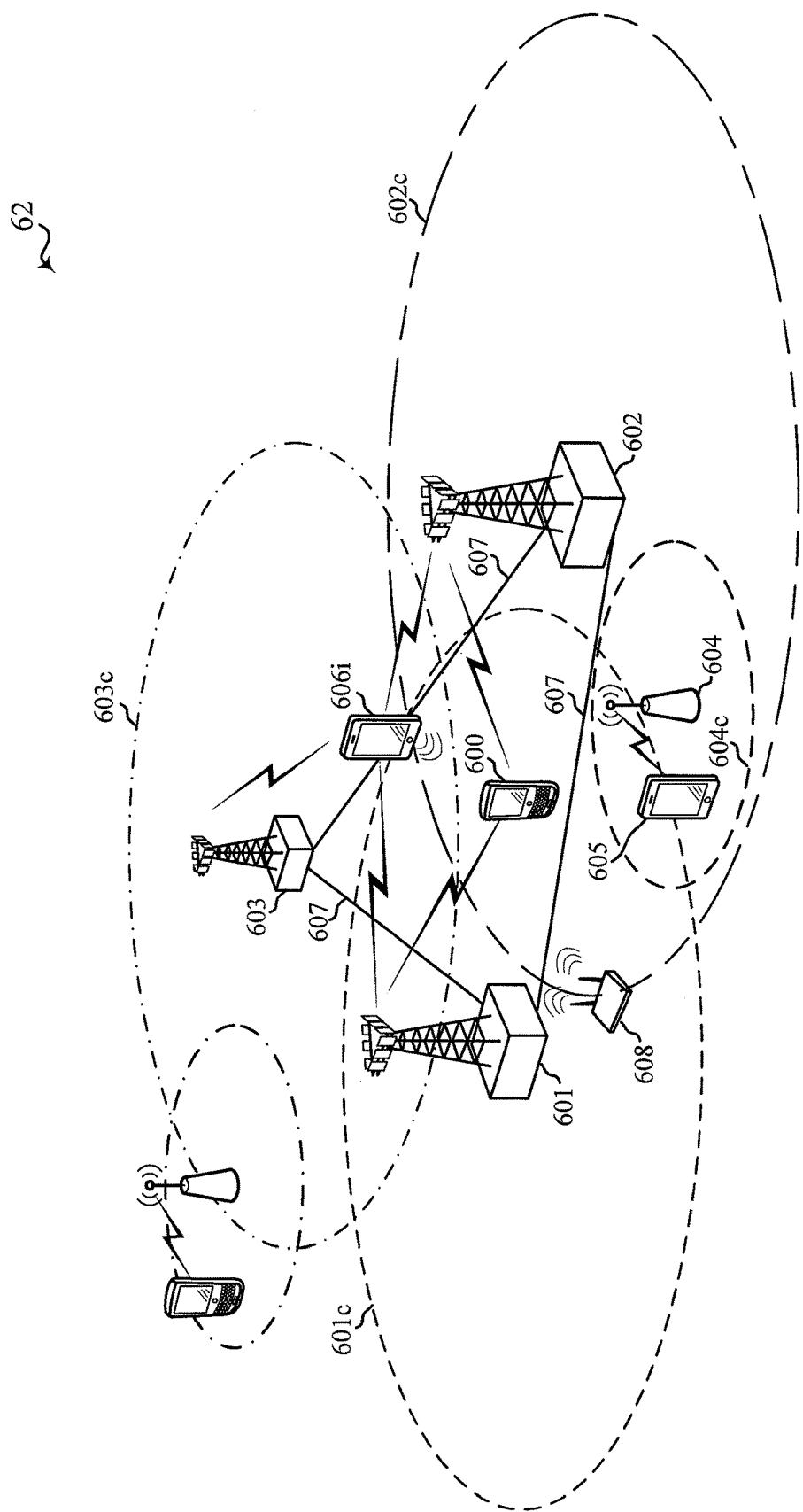

FIG. 6C is a block diagram illustrating network location 61 of an LTE/LTE-A network including unlicensed spectrum. For purposes of the example aspect illustrated in FIG. 6C, the same elements are identified. However, for the example illustrated in FIG. 6C, not only do eNBs 601-603 belongs to different MNOs, as shown in FIG. 6B, WiFi transmissions are present in network location 62 and provide interfering transmissions to UE 600. WiFi router 608 provides Internet access at a fixed location and UE 606i turns on the WiFi transmitter to access the Internet through another wireless WiFi router (not shown). Thus, interference may originate from network entities from the same operator, from different asynchronous operators, or also from the WiFi transmissions.

It should be noted that, depending on the interaction between the network entities associated with the LTE/LTE-A networks having unlicensed spectrum and the WiFi devices, there may be no interference impact to the LTE/LTE-A network with unlicensed spectrum.

The addition of WiFi signaling into the LTE/LTE-A network illustrated in FIG. 6B with eNBs from different MNOs may not change the variations to the interference pattern. For example, the interference pattern would again depend on the joint distribution of CCA status and results for each LBT frame and may originate from the same or different MNOs, in addition to the variable interference due to the traffic pattern variations between different transmitters. However, because WiFi signals are broadband, all data carrying WiFi subcarriers would be loaded. In LTE/LTE-A networks, signaling may be frequency selective depending on channel conditions and network loading. Thus, the interference pattern from WiFi signals could, in fact, causes differing interference patterns from LTE. Therefore, there is no guarantee that the variations to the interference pattern will not change based on WiFi transmissions.

For handling interference from synchronous sources within the same MNO, similar procedures to those described with regard to FIG. 6A may be used. For example, receiving CCA decisions at eNB 601 directly from the other eNBs over a backhaul or by determining the CCA results information based on observed or detected signals indicative of CCA results information. Interference seen from WiFi transmissions may be handled similarly to the interference originating from the different eNBs of the different operators, as illustrated and described in FIG. 6B. For example, for WiFi transmissions, an average or processed interference may be captured. As noted above, this hysteretic interference information is based not only on current interference measurements or detection, but on interference conditions detected over multiple LBT frames. This hysteretic interference information provides a more detailed summary of the interference that may be seen from fixed WiFi transmitters, such as from WiFi router 608, which may provide a more predictable or consistent interference, and from "hidden" WiFi sources, such as UE 606i, which will only transmit potentially interference WiFi signals, when the WiFi transmitter within UE 606i is activated. In one aspect, the WiFi interference may be separated from other unlicensed spectrum transmissions from network entities operating using LTE/LTE-A with unlicensed spectrum.

Various aspects of the present disclosure may differentiate the source of interference when computing CSI, such as interference originating from network entities of the same operator, from different operators, and from WiFi sources. Hysteretic interference information may then may be synthesized or determined through detection of CUBS or CSI-RS signaling measured over multiple, different LBT frames. These noise estimates may be weighted using information related to how a UE is experiencing any particular interference before being used for CSI computation. The weights may also be CCA success probability measured at UE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5A and 5B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    obtaining, by a base station, clear channel assessment (CCA) result information for a plurality of neighboring base stations, wherein the CCA result information is estimated, by at least one of the base station or one or more user equipments (UEs) served by the base station, by detecting channel usage beacon signals (CUBS) transmitted from the plurality of neighboring base stations in response to obtaining, by the plurality of neighboring base stations, CCA clearance, wherein a CUBS is transmitted on a channel immediately upon a successful CCA being performed on the channel;
    generating, by the base station, control signaling for the one or more UEs served by the base station, wherein the control signaling is generated to accommodate interference attributable to the neighboring base stations and is based, at least in part, on the CCA result information; and
    transmitting the control signaling to the one or more UEs.

2. The method of claim 1, wherein the obtaining includes one or more of:
    receiving, by the base station, the CCA result information via backhaul communication link to at least one of the plurality of neighboring base stations;
    receiving, by the base station, the CCA result information from the one or more UEs, wherein the CCA result information is determined from measurement estimates of transmission signals indicative of the CCA result information in a measurement report of the one or more UEs over a plurality of transmission frames; and
    detecting, by the base station, transmission signals indicative of the CCA result information from the one or more of the plurality of neighboring base stations over the plurality of transmission frames.

3. The method of claim 1, further including:
    obtaining, by the base station, hysteretic interference information based on interference detected from one or more neighboring base stations of the plurality of neighboring base stations over a plurality of transmission frames; and identifying, by the base station, the hysteretic interference information associated with at least one neighboring base station having asynchronous operation from other neighboring base stations of the plurality of base stations, wherein the control signaling is further generated based on the hysteretic interference information associated with the at least one neighboring base station.

4. The method of claim 3, wherein the obtaining the hysteretic interference information includes:
detecting, by the base station, a failed CCA for the base station;
measuring, by the base station, the interference experienced at the base station; and
generating the hysteretic interference information based, at least in part, on the measured interference.

5. The method of claim 4, further including:
receiving UE interference information from the one or more UEs, wherein the generating the hysteretic interference information includes weighting the measured interference using one or more of: the CCA result information and the UE interference information.

6. The method of claim 3, wherein the obtaining the hysteretic interference information includes receiving the hysteretic interference information from the one or more UEs as a part of a measurement report.

7. The method of claim 3, further including:
determining, by the base station, one or more timing offsets between the base station and the at least one neighboring base station based on the hysteretic interference information, wherein the control signaling is generated further based on the one or more timing offsets.

8. The method of claim 3, further including:
identifying, by the base station, the hysteretic interference information associated with at least one neighboring WiFi base station having WiFi transmissions, wherein the control signaling is further generated based on the hysteretic interference information associated with the at least one neighboring WiFi base station.

9. A method of wireless communication, comprising:
detecting, by a user equipment (UE), transmission signals indicative of clear channel assessment (CCA) result information for a plurality of neighboring base stations, wherein the transmission signals indicative of CCA result information include channel usage beacon signals (CUBS) transmitted from the plurality of neighboring base stations in response to obtaining, by the plurality of neighboring base stations, CCA clearance, wherein a CUBS is transmitted on a channel immediately upon a successful CCA being performed on the channel;
determining, by the UE, CCA result information estimate for the plurality of neighboring base stations based on the transmission signals indicative of CCA result information; and
transmitting, by the UE, a measurement report to a serving base station, wherein the measurement report includes the CCA result information estimate.

10. The method of claim 9, wherein the transmission signals indicative of CCA result information are detected across a plurality of transmission frames, and
wherein the CCA result information estimate is determined across the plurality of transmission frames.

11. The method of claim 1, wherein the control signaling that is generated to accommodate interference attributable to the neighboring base stations includes one or more modulation coding schemes (MCS) selected, based at least in part on the CCA result information, for the one or more UEs.

12. The method of claim 9, further including:
detecting, by the UE, interference conditions from the plurality of neighboring base stations over a plurality of transmission frames;
processing the interference conditions into hysteretic interference information associated with interference at the UE from the plurality of neighboring base stations, wherein the hysteretic interference information is included in the measurement report.

13. A computer program product for wireless communications in a wireless network, comprising:
a non-transitory computer-readable medium having program code recorded thereon, the program code including:
program code that, when executed on a computer, causes the computer to obtain, by a base station, clear channel assessment (CCA) result information for a plurality of neighboring base stations, wherein the CCA result information is estimated, by at least one of the base station or one or more user equipments (UEs) served by the base station, by detecting channel usage beacon signals (CUBS) transmitted from the plurality of neighboring base stations in response to obtaining, by the plurality of neighboring base stations, CCA clearance, wherein a CUBS is transmitted on a channel immediately upon a successful CCA being performed on the channel;
program code that, when executed on the computer, causes the computer to generate, by the base station, control signaling for the one or more UEs served by the base station, wherein the control signaling is generated to accommodate interference attributable to the neighboring base stations and is based, at least in part, on the CCA result information; and
program code that, when executed on the computer, causes the computer to transmit the control signaling to the one or more UEs.

14. The computer program product of claim 13, wherein the program code that, when executed on the computer, causes the computer to obtain includes one or more of:
program code that, when executed on the computer, causes the computer to receive, by the base station, the CCA result information via backhaul communication link to at least one of the plurality of neighboring base stations;
program code that, when executed on the computer, causes the computer to receive, by the base station, the CCA result information from the one or more UEs, wherein the CCA result information is determined from measurement estimates of transmission signals indicative of the CCA result information in a measurement report of the one or more UEs over a plurality of transmission frames; and
program code that, when executed on the computer, causes the computer to detect, by the base station, transmission signals indicative of the CCA result information from the one or more of the plurality of neighboring base stations over the plurality of transmission frames.

15. The computer program product of claim 13, further including:
program code that, when executed on the computer, causes the computer to obtain, by the base station, hysteretic interference information based on interference detected from one or more neighboring base stations of the plurality of neighboring base stations over a plurality of transmission frames; and program code that, when executed on the computer, causes the computer to identify, by the base station, the hysteretic interference information associated with at least one neighboring base station having asynchronous operation from other neighboring base stations of the plurality of base stations, wherein the control signaling is further generated based on the hysteretic interference information associated with the at least one neighboring base station.

16. The computer program product of claim 15, wherein the program code that, when executed on the computer, causes the computer to obtain the hysteretic interference information includes:
   program code that, when executed on the computer, causes the computer to detect, by the base station, a failed CCA for the base station;
   program code that, when executed on the computer, causes the computer to measure, by the base station, the interference experienced at the base station; and
   program code that, when executed on the computer, causes the computer to generate the hysteretic interference information based, at least in part, on the measured interference.

17. The computer program product of claim 16, further including:
   program code that, when executed on the computer, causes the computer to receive UE interference information from the one or more UEs, wherein the program code that, when executed on the computer, causes the computer to generate the hysteretic interference information includes program code that, when executed on the computer, causes the computer to weight the measured interference using one or more of: the CCA result information and the UE interference information.

18. The computer program product of claim 15, wherein the program code that, when executed on the computer, causes the computer to obtain the hysteretic interference information includes program code that, when executed on the computer, causes the computer to receive the hysteretic interference information from the one or more UEs as a part of a measurement report.

19. The computer program product of claim 15, further including:
   program code that, when executed on the computer, causes the computer to determine, by the base station, one or more timing offsets between the base station and the at least one neighboring base station based on the hysteretic interference information, wherein the control signaling is generated further based on the one or more timing offsets.

20. The computer program product of claim 15, further including:
   program code that, when executed on the computer, causes the computer to identify, by the base station, the hysteretic interference information associated with at least one neighboring WiFi base station having WiFi transmissions, wherein the control signaling is further generated based on the hysteretic interference information associated with the at least one neighboring WiFi base station.

21. An apparatus configured for wireless communication, the apparatus comprising:
   at least one processor; and
   a memory coupled to the at least one processor, wherein the at least one processor is configured:
   to obtain, by a base station, clear channel assessment (CCA) result information for a plurality of neighboring base stations, wherein the CCA result information is estimated, by at least one of the base station or one or more user equipments (UEs) served by the base station, by detecting channel usage beacon signals (CUBS) transmitted from the plurality of neighboring base stations in response to obtaining, by the plurality of neighboring base stations, CCA clearance, wherein a CUBS is transmitted on a channel immediately upon a successful CCA being performed on the channel;
   to generate, by the base station, control signaling for the one or more UEs served by the base station, wherein the control signaling is generated to accommodate interference attributable to the neighboring base stations and is based, at least in part, on the CCA result information; and
   to transmit the control signaling to the one or more UEs.

22. The apparatus of claim 21, wherein the configuration of the at least one processor to obtain includes configuration of the at least one processor to one or more of:
   receive, by the base station, the CCA result information via backhaul communication link to at least one of the plurality of neighboring base stations;
   receive, by the base station, the CCA result information from the one or more UEs, wherein the CCA result information is determined from measurement estimates of transmission signals indicative of the CCA result information in a measurement report of the one or more UEs over a plurality of transmission frames; and
   detect, by the base station, transmission signals indicative of the CCA result information from the one or more of the plurality of neighboring base stations over the plurality of transmission frames.

23. The apparatus of claim 21, further including configuration of the at least one processor:
   to obtain, by the base station, hysteretic interference information based on interference detected from one or more neighboring base stations of the plurality of neighboring base stations over a plurality of transmission frames; and
   to identify, by the base station, the hysteretic interference information associated with at least one neighboring base station having asynchronous operation from other neighboring base stations of the plurality of base stations, wherein the control signaling is further generated based on the hysteretic interference information associated with the at least one neighboring base station.

24. The apparatus of claim 23, wherein the configuration of the at least one processor to obtain the hysteretic interference information includes configuration of the at least one processor:
   to detect, by the base station, a failed CCA for the base station;
   to measure, by the base station, the interference experienced at the base station; and
   to generate the hysteretic interference information based, at least in part, on the measured interference.

25. The apparatus of claim 24, further including configuration of the at least one processor to receive UE interference information from the one or more UEs, wherein the configuration of the at least one processor to generate the hysteretic interference information includes configuration to weight the measured interference using one or more of: the CCA result information and the UE interference information.

26. The apparatus of claim 23, wherein the configuration of the at least one processor to obtain the hysteretic interference information includes configuration to receive the hysteretic interference information from the one or more UEs as a part of a measurement report.

27. The apparatus of claim 23, further including configuration of the at least one processor to determine, by the base station, one or more timing offsets between the base station and the at least one neighboring base station based on the hysteretic interference information, wherein the control signaling is generated further based on the one or more timing offsets.

28. The apparatus of claim 23, further including configuration of the at least one processor to identify, by the base station, the hysteretic interference information associated with at least one neighboring WiFi base station having WiFi transmissions, wherein the control signaling is further generated based on the hysteretic interference information associated with the at least one neighboring WiFi base station.

\* \* \* \* \*